Patented Oct. 2, 1928.

1,686,440

UNITED STATES PATENT OFFICE.

HENRY W. DAHLBERG, OF DENVER, COLORADO.

RECOVERING SUCROSE FROM MIXTURES CONTAINING REDUCING SUGARS.

No Drawing. Application filed September 23, 1926. Serial No. 137,379.

This invention relates to a process for recovering sucrose from mixtures of sucrose and reducing sugars, and pertains particularly to steps by which such sucrose content may be obtained more readily and more cheaply than has heretofore been possible.

In this present invention, it has been found that the presence of reducing sugars exercises an undesirable dissolving effect on saccharates and which effect causes resultant loss in sucrose production. This can be largely prevented by procedure hereinafter described and in accordance with which the amount of sucrose compared to the amount of reducing sugar in the mixture about to undergo treatment is regulated.

Many attempts have been made to recover sucrose from syrups containing both sucrose and reducing sugars. A typical example of such syrup is cane molasses which possesses various materials in proportions which vary according to the output of the factory. A typical analysis of a typical example of cane molasses is:

|  | Per cent. |
|---|---|
| Dry substance | 81.8 |
| Polarization | 27.5 |
| Sucrose | 31.7 |
| Reducing sugars | 21.0 |
| Ash | 10.4 |

Although the composition of syrups, containing sucrose and reducing sugars, may vary within rather wide limits, the majority of them are characterized by having a ratio of sucrose to reducing sugar of from 1.1 to 1 to 2.5 to 1. The presence of reducing sugars in these syrups has always been a serious obstacle in the way of precipitating the sucrose with an alkaline earth. In the case of molasses from sugar beets, containing no reducing sugars, it has been possible for many years to recover sucrose as calcium, strontium or barium saccharates. Treatment of cane products, however, has met with failure particularly when it has been attempted to precipitate in a single step one of these saccharates, and probably for the following reasons:

1. There has been incomplete precipitation of sucrose.
2. There has been formation of highly colored decomposition products of reducing sugars.
3. Saccharates of low purity have been formed.

Various methods have been proposed to overcome the difficulties thus experienced. One method employs fermentation of the reducing sugars by the use of micro-organisms of the pseudo-saccharomyces apiculatus group before precipitating the sucrose as calcium saccharate. By another method the reducing sugars are initially destroyed by prolonged heating at 85° C. with mono-barium silicate, after which the sucrose is precipitated as a saccharate. Both of these indicated methods are difficult to perform and costly to operate and the reducing sugars are not completely removed. The first method has proved unsatisfactory because all of the reducing sugars are not fermented and a low purity of saccharate is obtained, probably only about 80 per cent pure. The second method is objectionable because the prolonged heating at 85° C. causes decomposition of both sucrose and reducing sugars which products affect both the color and the purity of the barium saccharate. Both of these methods involve the use of several steps for the production of the saccharate and its precipitation.

In contrast to known processes and in contrast to the above identified processes the present improvement is very simple and gives relatively high yields of extractable sucrose. The new process is performed outright in a direct single step of barium saccharate precipitation, and is particularly adapted to treatment of cane syrups for the precipitation of sucrose with the use of barium hydrate.

As a result of the present invention it has now been established that barium saccharate is apparently quite soluble in a solution of reducing sugars, and the presence of the latter in large quantities therefore causes very incomplete precipitation of sucrose. This will be clear in the following comparison in which two syrups with different ratios of sucrose to reducing sugars are treated in exactly the same way with 75 per cent BaO on weight of sucrose, and in the form of barium hydrate.

*Syrup No. 1.*

| Direct polarization | 45.6 |
|---|---|
| Dry substance | 71.0 |

| | |
|---|---|
| Reducing sugars | 11.0 |
| Ratio sucrose to red. sugar | 4.1 to 1 |
| BaO used on sucrose | 75% |
| % of sucrose precipitated | 94.6% |

*Syrup No. 2.*

| | |
|---|---|
| Direct polarization | 38.3 |
| Dry substance | 79.8 |
| Reducing sugars | 15.9 |
| Ratio sucrose to red. sugar | 2.4 to 1 |
| BaO used on sucrose | 75% |
| % of sucrose precipitated | 65.4% |

It is obvious from the comparison of these two sets of data that the low ratio of sucrose to reducing sugars in syrup No. 2 caused very incomplete precipitation, only 65.4 per cent. This result is typical. The precipitate in syrup No. 2 proved to be very fine grained and formed with great difficulty whereas the precipitate in No. 1 was crystalline, extremely so, and easy to filter.

The present invention is directed toward the preventing of the solubility effect of the reducing sugars on barium saccharate. This is done by artificially regulating the ratio of sucrose to reducing sugars. This regulation may be effected by either of the two following methods:

a. By increasing the ratio of sucrose to reducing sugars to a minimum of 2.8 to 1.0, respectively, and beyond this minimum to any desired maximum by mixing beet molasses containing no reducing sugars with cane molasses containing a ratio lower than 2.8 to 1.0.

b. By increasing the ratio of sucrose to reducing sugars to a minimum of 2.8 to 1.0, respectively, and beyond this minimum to any desired maximum by mixing two cane syrups, one with a lower ratio than 2.8 to 1.0 and the other with a ratio higher than 2.8 to 1.0.

By means of the above prescribed regulation of the sucrose-reducing sugar ratio, it becomes possible to obtain maximum precipitation of sucrose, and with resultant high purity saccharate juices. Using this procedure saccharate juices have been obtained having purities, after carbonation, as high as 93.0 per cent, whereas without such regulation purities fell as low as 75.0 per cent. It is known that the yield of extractable sugar rises very rapidly with small increases in purity, for example 1 per cent increase in purity effecting an increase of about 2.5 per cent in extractable sugar.

The essential steps of the complete process may be summarized as follows:

1. Regulating the ratio as described above.
2. Precipitating the sucrose with barium hydrate at a temperature of from 60° C. to 85° C.
3. Recovering sucrose from the barium saccharate by well known methods.

The second and third steps are necessarily predicated on the regulation of sucrose to reducing sugar so that it exceeds 2.8 to 1.0. Such regulation is the step that makes the process commercially operable and advantageous, inasmuch as without it the consumption of barium reagent is too high, the loss of sugar in the mother liquor is too great and the resultant purity of the saccharate juice is too low.

The process can be readily adapted to the present process of cane sugar refining in the following way: A cane sugar refinery produces final refinery molasses having high reducing sugar content, quite unsuitable for barium saccharate precipitation. Such a refinery also produces intermediate syrups known as "concentrated sweet water" and which are obtained by washing the usual bone char filters. Concentrated sweet water syrup is high in sucrose and low in reducing sugar and is therefore very suitable for use in increasing the ratio of sucrose to reducing sugars in the final molasses. At present, no sugar is being recovered from the final molasses and only a small part of the available sugar is recovered from the concentrated sweet water. By combining the two syrups in proper proportions to get a ratio of more than 2.8 to 1.0 a total sucrose recovery of 75 per cent to 85 per cent may be effected. If concentrated sweet water syrup is not readily available, the same result can be obtained by artificially changing the ratio in the final refinery molasses by adding to it beet molasses in the desired proportions.

Although barium saccharate is preferred it will be obvious that calcium and strontium saccharates may be produced even though not so effectively or so much desired.

Emphasis is to be placed on the fact that with the use of barium hydroxide the addition of this material and the precipitation is effected directly and in a single step.

It is noteworthy that the use of mass action is invoked in forming a precipitate of barium saccharate from syrups containing reducing sugars and the precipitate is formed under such conditions that it is of a crystalline nature and therefore occludes a minimum of the mother liquor.

The effect of the adjustment of the concentration of sucrose and reducing sugars in a syrup with relation to each other actually results in a minimum of solvent action on a precipitate of barium saccharate when barium hydroxide is added to the syrup at a high temperature.

I claim:—

1. The process of recovering sucrose from mixtures of sucrose and reducing sugars which process consists of treating a mixture of sucrose and reducing sugars by regulating the ratio of amount of sucrose to reducing sugar to include at least 2.8 of sucrose to 1.0 of reducing sugar, precipitating the sucrose by treating the mixture thus regulated with an alkaline earth metal and thus forming an alkaline earth metal saccharate, and separating saccharate into an alkaline earth metal compound and sugar syrup.

2. The process of recovering sucrose from mixtures of sucrose and reducing sugars which process consists of treating a mixture of sucrose and reducing sugars by regulating the ratio of amount of sucrose to reducing sugar to include at least 2.8 of sucrose to 1.0 of reducing sugar, precipitating the sucrose by treating the mixture thus regulated with an alkaline earth metal and under temperature conditions of between 60° C. and 85° C., and separating the saccharate into an alkaline earth metal compound and sugar syrup.

3. The process of recovering sucrose from mixtures of sucrose and reducing sugars which process consists of treating a mixture of sucrose and reducing sugars by regulating the ratio of amount of sucrose to reducing sugar to include at least 2.8 of sucrose to 1.0 of reducing sugar, precipitating the sucrose by treating the mixture thus regulated with barium hydrate, and separating the resultant barium saccharate into a barium compound and a sugar syrup.

4. In the manufacture of sugar from mixtures of sucrose and reducing sugars, the step of preparing the mixture for treatment with an alkaline earth metal which step consists of regulating the ratio of the amount of sucrose to reducing sugar to include at least 2.8 of sucrose to 1.0 of reducing sugar.

5. In the manufacture of sugar from mixtures of sucrose and reducing sugars, the steps of preparing the mixture for treatment with an alkaline earth metal and incorporating such material, which steps consist of treating a mixture including sucrose and reducing sugars by regulating the ratio of amount of sucrose to reducing sugar to include at least 2.8 of sucrose to 1.0 of reducing sugar, and precipitating the sucrose by treating the mixture thus regulated directly and in a single step with barium hydrate and thus forming barium saccharate.

6. In the manufacture of sugar from mixtures of sucrose and reducing sugars, the step of forming an alkaline earth metal saccharate from a mixture including at least 2.8 of sucrose to 1.0 of reducing sugar, which step consists of adding to such a mixture directly in a single step the requisite amount of barium hydroxide to combine with the sucrose and thereby forming barium saccharate.

7. The process of recovering sucrose from mixtures of sucrose and reducing sugars, which process consists of regulating the ratio of amounts of sucrose to reducing sugar in final cane refinery molasses and until the ratio of sucrose to reducing sugar is respectively 2.8 to 1.0 by adding to such final molasses the concentrated sweet water obtained by washing filters and which sweet water is higher in content of sucrose than is the content of sucrose in molasses.

8. In the process of recovering sucrose from mixtures of sucrose and reducing sugar, the step of regulating the amount of sucrose to reducing sugar and which step consists of adding to cane molasses containing lower than 2.8 of sucrose to 1.0 of reducing sugar sufficient of beet molasses containing relatively no reducing sugar until the average of the mixture contains at least 2.8 of sucrose to 1.0 of reducing sugar.

9. In the manufacture of sugar from mixtures of sucrose and reducing sugars, the steps of preparing a mixture containing sucrose and reducing sugars for treatment with an alkaline earth metal hydroxide to counteract the dissolving action of the reducing sugar on the saccharate by increasing the amount of sucrose compared to the amount of reducing sugar by adding a sucrose containing material to the mixture, and thereafter treating the mixture so prepared with an alkaline earth metal hydroxide and thereby producing a saccharate.

10. In the manufacture of sugar from mixtures of sucrose and reducing sugars, the steps of preparing a mixture containing sucrose and reducing sugars for treatment with an alkaline earth metal hydroxide to counteract the dissolving action of the reducing sugar on the saccharate by increasing the amount of sucrose in the mixture with respect to the amount of reducing sugar present, and thereafter treating the mixture so prepared with an alkaline earth metal hydroxide and thereby producing a saccharate.

11. In the manufacture of sugar from mixtures of sucrose and reducing sugars, the steps of preparing a mixture containing sucrose and reducing sugars for treatment with an alkaline earth metal hydroxide to counteract the dissolving action of the reducing sugar on the saccharate, which step consists of increasing the amount of sucrose compared to the amount of reducing sugar by adding sucrose to the mixture until the mixture displays substantially no dissolving action on an alkaline earth metal saccharate when the latter is precipitated from the mixture.

In testimony whereof I affix my signature.

HENRY W. DAHLBERG.